B. M. EDELEN, Jr.
PLOW.
APPLICATION FILED JUNE 29, 1909.
957,045.  Patented May 3, 1910.
4 SHEETS—SHEET 4.
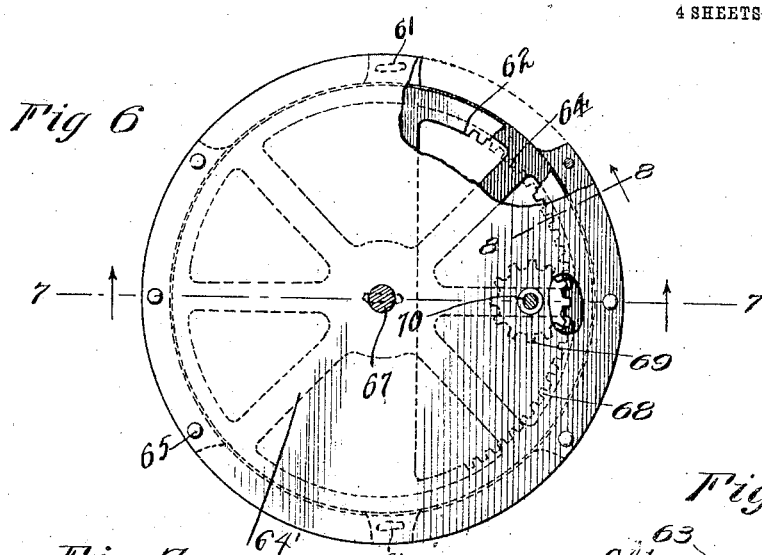
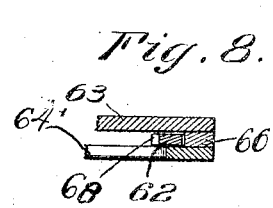
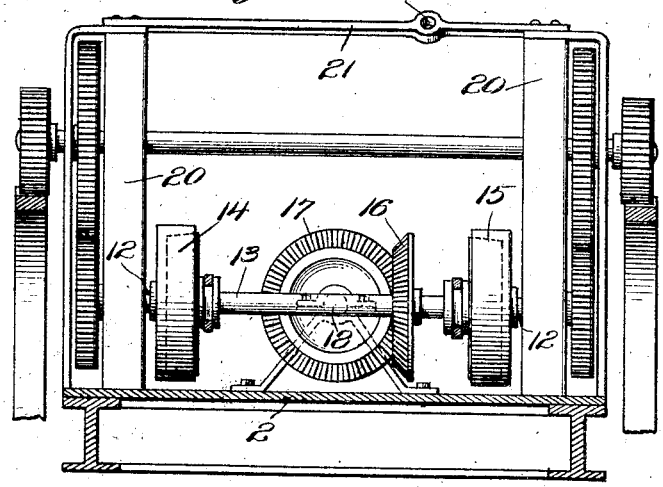
Witnesses
Wm. Smith
P. M. Smith
Inventor
Benjamin M. Edelen Jr.
By Victor J. Evans
Attorney

UNITED STATES PATENT OFFICE.

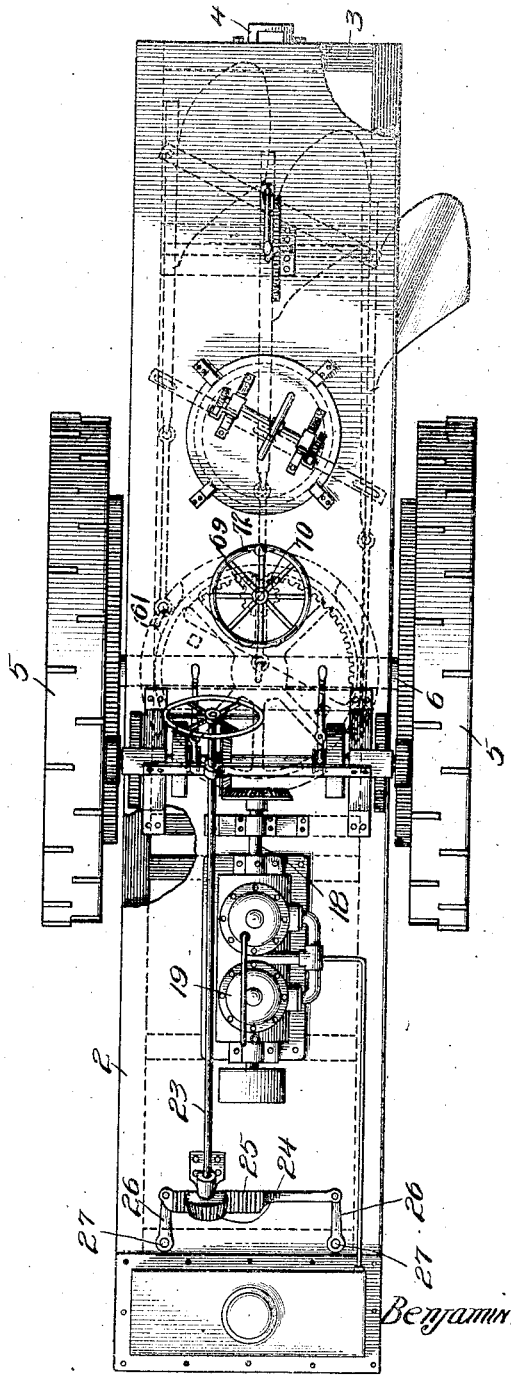

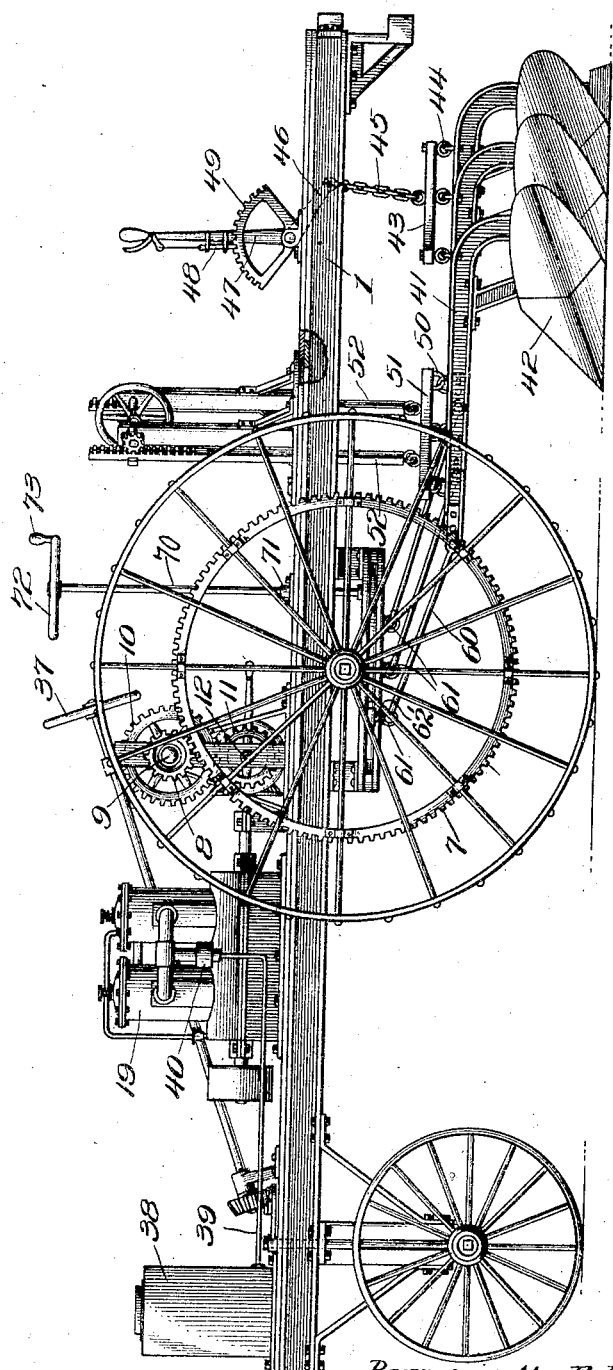

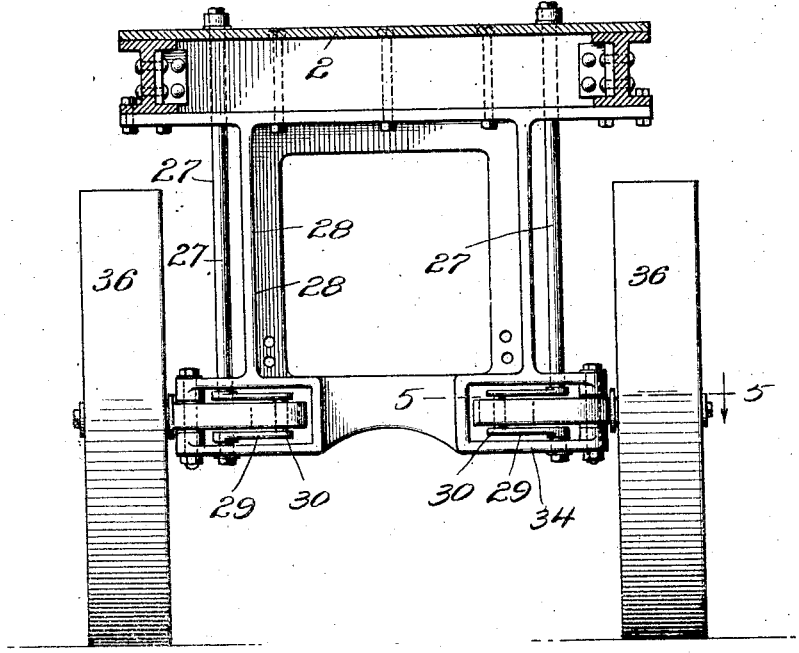
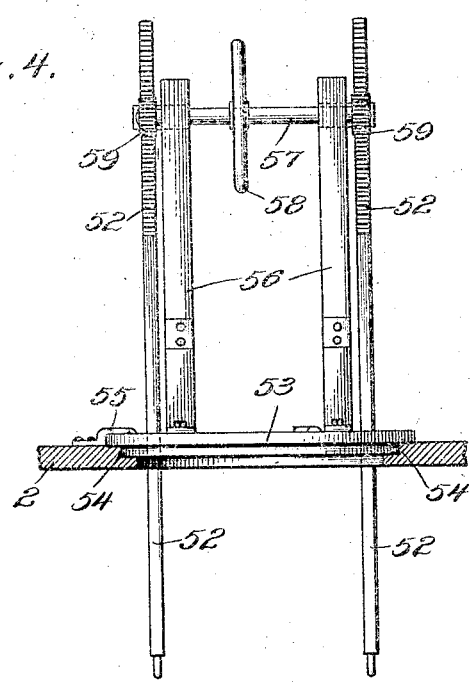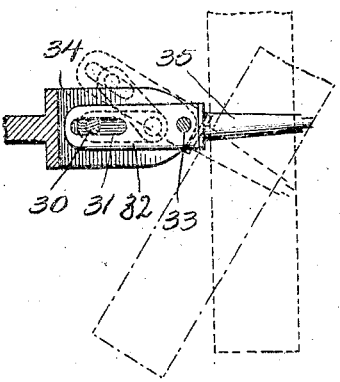

BENJAMIN M. EDELEN, JR., OF BRYANTOWN, MARYLAND.

PLOW.

957,045.

Specification of Letters Patent.

Patented May 3, 1910.

Application filed June 29, 1909. Serial No. 505,026.

*To all whom it may concern:*

Be it known that I, BENJAMIN M. EDELEN, Jr., a citizen of the United States, residing at Bryantown, in the county of Charles and State of Maryland, have invented new and useful Improvements in Plows, of which the following is a specification.

This invention relates to plows, the object in view being to provide a motor plow, or in other words, a plow embodying a frame to which the gang of plows are connected, combined with carrying and traction wheels on which the machine frame is supported, and a motor also mounted on the frame and adapted to propel the wheels and drive the plow, combined with means for adjusting, controlling and reversing the plows or shovels as will hereinafter fully appear.

To the above end, the invention consists in the novel construction, combination and arrangement of parts, herein fully described, illustrated and claimed.

In the accompanying drawings:—Figure 1 is a plan view of a motor plow embodying the present invention. Fig. 2 is a side elevation of the same. Fig. 3 is a vertical cross section through the plow, showing a portion of the steering gear. Fig. 4 is a vertical cross section taken adjacent to the turn table, showing the rack and pinion mechanism for adjusting the plow beams up and down. Fig. 5 is an enlarged detail horizontal section on the line 5—5 of Fig. 3. Fig. 6 is a plan view partly broken away of the annulus and operating mechanism therefor. Fig. 7 is a vertical cross section through the same on the line 7—7 of Fig. 6. Fig. 8 is a detail vertical section on the line 8—8 of Fig. 6. Fig. 9 is a vertical cross section through the machine taken adjacent to the transmission shaft.

The machine frame comprises parallel longitudinal or side bars 1 suitably connected by cross braces at various points in the length thereof and having mounted thereon a platform 2, the rear cross bar 3 of said frame being secured thereto clips or eyes 4 for the attachment of a planter, drill, harrow or other agricultural implement to be dragged behind the plow frame.

The machine frame is supported upon a pair of combined traction and carrying wheels 5, as shown in Figs. 1 and 2, and said wheels are mounted upon a main axle 6. Connected to each of the wheels 5 is a toothed rim 7 which meshes with and is driven by a pinion 8 fast on a counter-shaft 9 on which is also mounted a spur gear wheel 10 which meshes with a pinion 11 on a transmission shaft 12.

The mechanism just referred to is duplicated at each side of the machine so that each combined traction and carrying wheel may be connected to or disconnected from the central section 13 of the transmission shaft by means of clutches 14 and 15 as shown in Fig. 9. The intermediate or central section 13 of the transmission shaft carries a bevel gear wheel 16 which meshes with a corresponding bevel gear wheel 17 on the engine shaft 18. 19 designates the engine or motor by means of which the shaft 18 is driven, the gearing referred to and just hereinabove described serving to impart motion to either or both of the combined traction and carrying wheels 5 in a manner readily understood.

The transmission shaft hereinabove referred to is mounted in suitable bearing standards 20 extending upward from the platform 2 as best illustrated in Fig. 9 and said bearing standards are connected at the top by means of a cross brace or connecting bar 21 which is provided with a bearing opening 22 for a steering bar 23, the latter extending forward where it is provided with a pinion 24 which meshes with and operates a rack bar 25. This rack bar is connected pivotally at its opposite ends to a pair of crank arms 26 on the upper ends of a pair of steering shafts 27 which extend downwardly through a substantially rectangular sub-frame 28 bolted or otherwise secured to the main frame of the machine as shown in Fig. 3, the shafts 27 being journaled in the sub-frame and also in the platform 2, as shown in Fig. 3. Adjacent to their lower ends, the shafts 27 are provided with cranks 29, the crank pins 30 of which work in slots 31 in steering knuckles 32, the latter being pivotally mounted at 33 in extensions or forks 34 of the sub-frame as shown in Figs. 3 and 5. The steering knuckles 32 are provided with outwardly projecting spindles 35 upon which the steering wheels are journaled. The steering bar 23 is provided at its rear end with a hand wheel 37 to enable the operator to steer the machine in any desired direction.

38 designates a gasolene tank from which a supply pipe 39 leads to the carbureter 40 of the motor or engine 19.

Arranged under the rear portion of the machine frame is a gang of plows each embodying a plow beam 41 and a shovel or plow share 42 which is pivotally mounted on the standard portion of the plow beam so that it may be turned over or reversed to throw the furrow in either direction desired. The plows, when in operation, are arranged in an oblique line or in other words in a line oblique to the path of movement of the machine as indicated in Fig. 1, the plow beams being supported adjacent to their rear ends by means of a hanger bar 43 having a linked connection as shown at 44 with the plow beams 41. The bar 43 is centrally supported and suspended by means of a chain 45 the upper end of which is connected to the shorter arm 46 of an elbow thumb latch lever 47, the latch 48 of which is adapted to engage with any desired notch or tooth of a rack segment 49 mounted on the machine frame. The machine just described provides for raising and lowering the rear portions of the several plow beams 41.

Adjacent to their forward ends, the plow beams are all secured by a linked connection at 50 with another hanger bar 51 which is in turn connected at points equi-distant from its center to the lower ends of a pair of rack bars 52. These rack bars 52, as shown in Fig. 4, slide up and down through openings in the turn table 53 which is flanged and mounted in a rabbeted circular recess 54 in the platform 2, the turn table being retained in position in said rabbeted recess by means of clips 55. Extending upward from the turn table 53 are parallel standards 56 in the upper ends of which is journaled a horizontal pinion shaft 57 provided with a hand-operated wheel 58. At its opposite ends, the shaft 57 is provided with pinions 59 which mesh with the rack bars 52 so that by turning the hand wheel 58, the rack bars 52 may be adjusted upward and downward for the purpose of correspondingly raising and lowering the hanger bar 51 and correspondingly elevating and depressing the forward ends of the plow beams 41.

Connected to the front ends of the plow beams 41 are outer or side draft links or rods 60 and a central or intermediate draft link or rod, all of said rods being connected at their forward ends to an oscillatory reversing annulus 62, the outer rods being connected to short arms 62' which project from the periphery of the annulus while the center rod is connected to an eye on the pivot of the annulus.

The annulus, as shown in Figs. 6, 7 and 8 is mounted in a guide frame consisting of an upper plate 63 and a lower plate 64, the same being bolted together as shown at 65 on opposite sides of spacing segments 66 which hold the upper and lower plates at the proper distance apart to permit the annulus 62 to slide freely between the same. The annulus is journaled on a center pivot 67 passing through the upper and lower plates 63 and 64. The annulus 62 is also toothed upon its inner side as shown at 68 and is operated by means of a pinion 69 on the lower end of a reversing shaft 70 which extends upward through a suitable bearing 71 of the platform and is provided at its upper end with a reversing wheel 72 having a crank handle 73. The operator by turning the wheel 72 may thus revolve the pinion 69 and turn the annulus in one direction or the other as may be required. It will now be apparent that by turning the annulus in the manner described, the outer plow beams 41 may be drawn forward or pushed rearward so that the line thereof may be adjusted as to angle and so that the plows may be positioned in the oblique relation indicated in Fig. 1 or at a reverse inclination, thereby adapting the plow to operate with equal effect in its progress across the field irrespective of the direction in which the plow is moving. This avoids the necessity of driving the plow entirely around the section of the field being operated upon and enables the operator to reverse the plows at each end of the furrow and return in a path parallel to that previously traveled, while always turning the furrows to the same side. In turning the annulus, the turn table is correspondingly moved in the proper direction and the degree of angularity of the hanger bars 43 and 51 is correspondingly changed. By means of the thumb latch lever and the hand wheel 58 hereinabove described, the angle of the plow beams may be adjusted to suit conditions, to give the proper entrance or penetrations of the shovels or plow points and the plows may be raised entirely clear of the ground for the purpose of driving the plow to and from the field or point of operation.

The steering and driving wheels of the plow are all arranged in advance of the plows themselves so as to travel on solid ground and the entire mechanism described hereinabove is mounted on a single frame, the machine, as a whole, being, therefore, complete in itself.

I claim:—

1. A plow embodying a frame, carrying wheels therefor, a gang of plow beams, plows carried by said beams, a flexibly suspended hanger bar by which the plow beams are supported, and an oscillatory annulus to which the plow beams are connected.

2. A plow embodying a frame, carrying wheels therefor, a gang of plow beams, plows carried by said beams, a flexibly suspended hanger bar by which the plow beams are supported, an oscillatory annulus to which the plow beams are connected, and means for turning said annulus.

3. A plow embodying a frame, carrying wheels therefor, a gang of plow beams, plows carried by said beams, a flexibly suspended hanger bar by which the plow beams are supported, an oscillatory annulus to which the plow beams are connected, and a hand-operated shaft geared to said annulus for turning the latter.

4. A plow embodying a frame, carrying wheels therefor, a gang of plows, a flexibly suspended hanger bar by which the plows are supported, a toothed oscillatory annulus to which the plow beams are connected, and an operating shaft having a pinion coöperating with the toothed annulus for turning the latter.

5. A plow embodying a frame, carrying wheels therefor, a gang of plows, a flexibly suspended hanger bar by which the plow beams are supported, an oscillatory annulus to which the plows are connected, and means for raising and lowering said hanger bar.

6. A plow embodying a frame, carrying wheels therefor, a gang of plows, a flexibly suspended hanger bar by which the plows are supported, an oscillatory annulus to which the plows are connected, and rack and pinion mechanism for raising and lowering said hanger bar.

7. A plow embodying a frame, carrying wheels therefor, a gang of plows, a flexibly suspended hanger bar by which the plows are supported, an oscillatory annulus to which the plow beams are connected, a turn table, and rack and pinion mechanism on said turn table for raising and lowering the hanger bar.

8. A plow embodying a frame, carrying wheels therefor, a gang of plows and a flexibly suspended hanger bar by which the plows are supported, an oscillatory annulus to which the plows are connected, a turn table, parallel rack bars having a sliding relation to said turn table, and connected to the hanger bar, an operating shaft, and pinions on said shaft meshing with said rack bars.

9. A plow embodying a frame, carrying wheels therefor, a gang of plows, a plurality of flexibly suspended hanger bars by which the plows are supported in different points in the length thereof, an oscillatory annulus to which the plows are connected, and means for independently raising and lowering said hanger bars.

In testimony whereof I affix my signature in presence of two witnesses.

BENJAMIN M. EDELEN, JR.

Witnesses:
WALTER A. JAMESON,
C. LESLIE SHRODES.